T. CANBY.
MACHINE FOR CROPPING OR SHEARING CLOTH.
APPLICATION FILED JUNE 5, 1918.
1,277,694.
Patented Sept. 3, 1918.
3 SHEETS—SHEET 1.
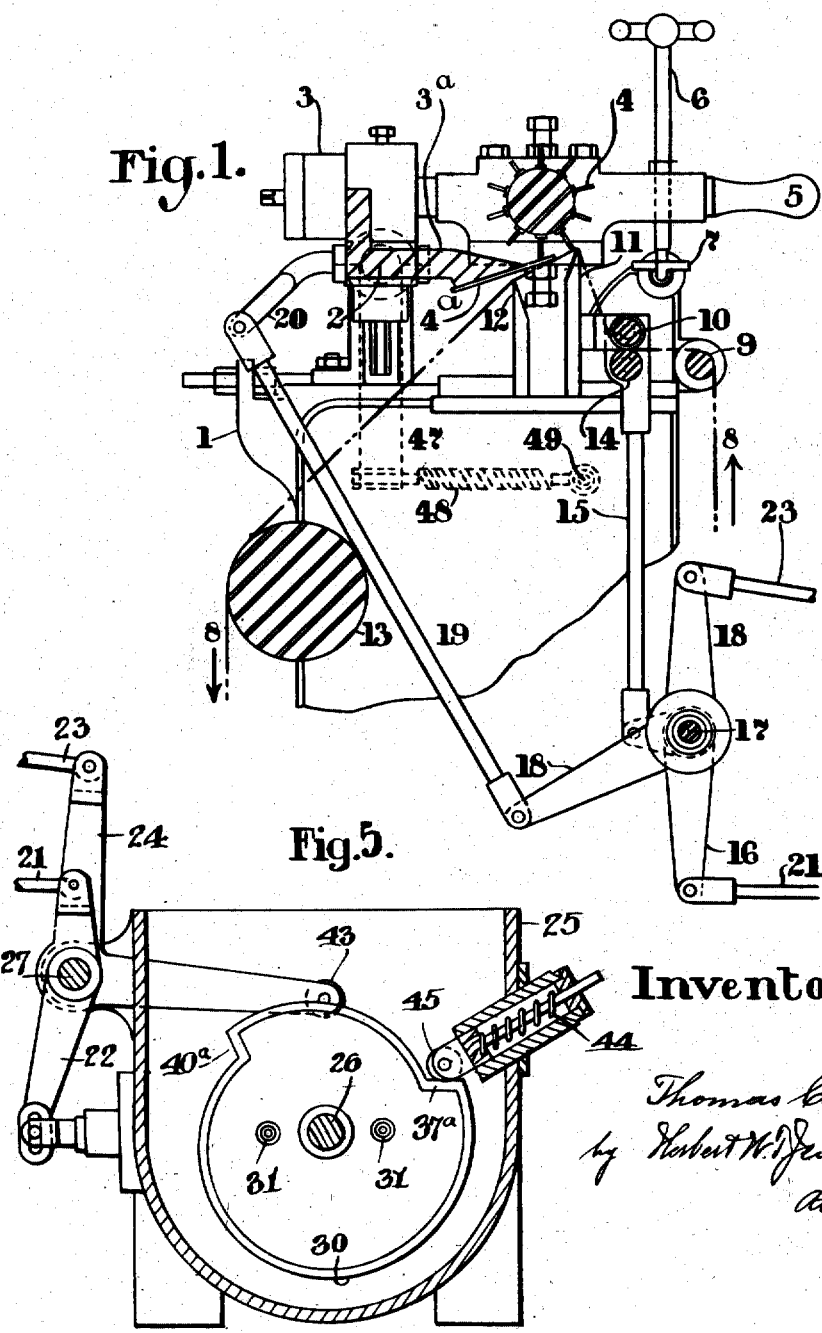

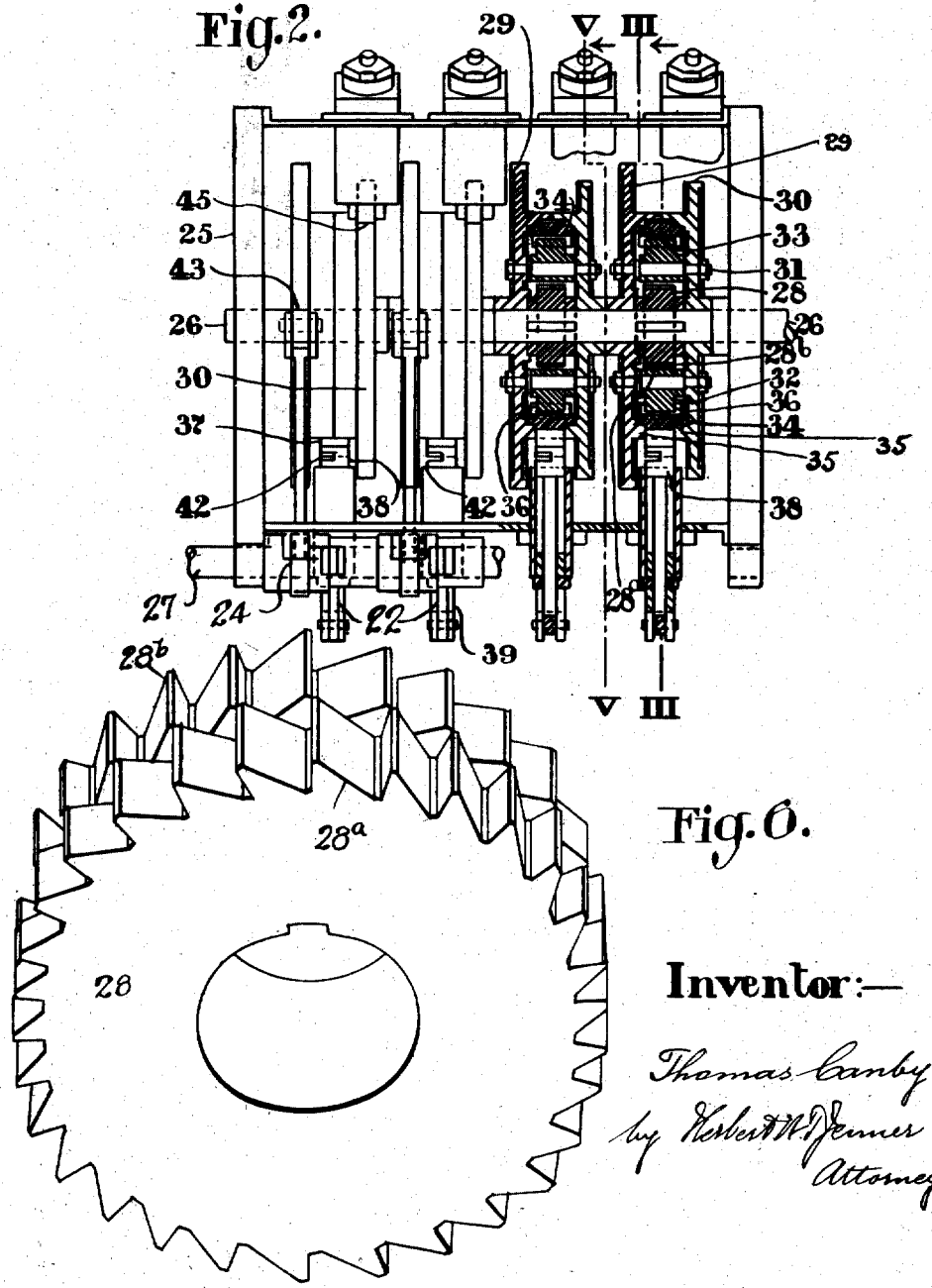

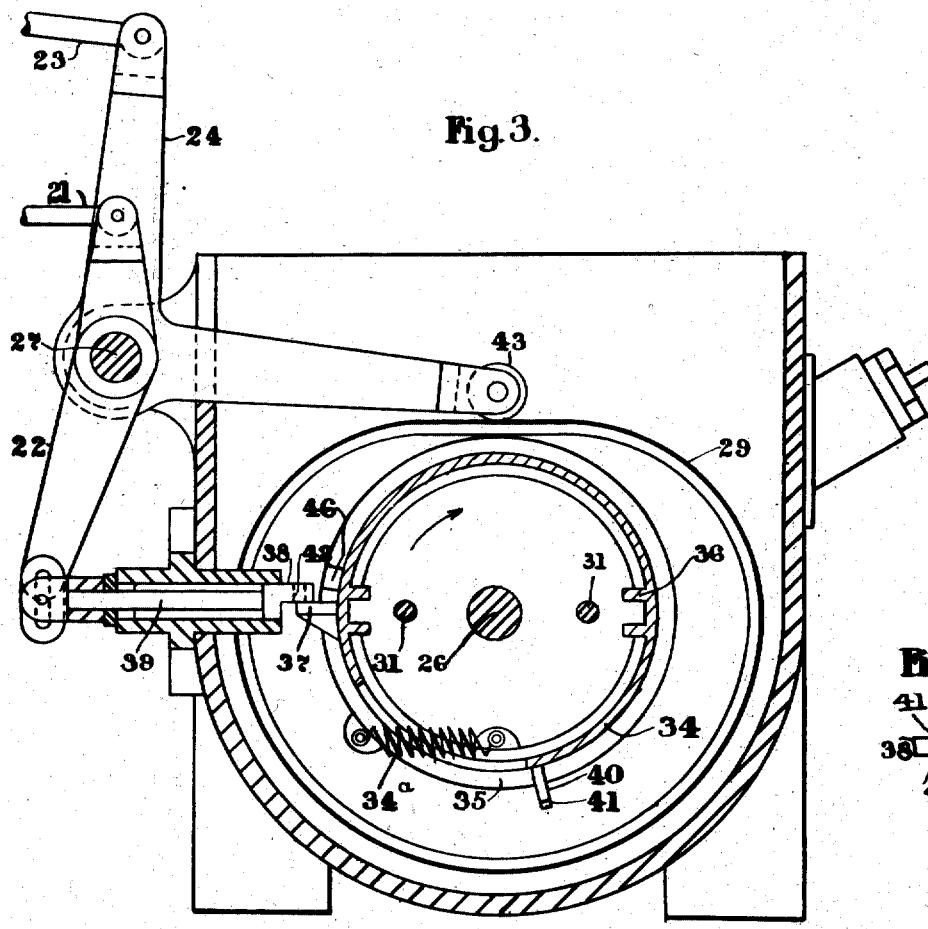
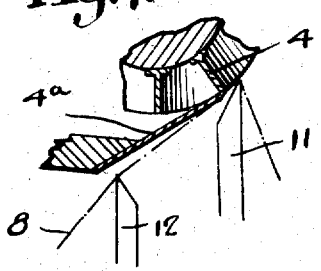

UNITED STATES PATENT OFFICE.

THOMAS CANBY, OF HUDDERSFIELD, ENGLAND.

MACHINE FOR CROPPING OR SHEARING CLOTH.

1,277,694.    Specification of Letters Patent.    Patented Sept. 3, 1918.

Application filed June 5, 1918. Serial No. 238,295.

*To all whom it may concern:*

Be it known that I, THOMAS CANBY, a subject of the King of Great Britain, residing at Victoria Mills, Lockwood, Huddersfield, in the county of York, England, have invented certain new and useful Improvements in Machines for Cropping or Shearing Cloth, of which the following is a specification.

This invention relates to machines for cropping or shearing cloth, of the type in which the cloth is fed over tension or guide rails or rollers to pass under a rotary helical cutter, and drawn therefrom by taking up rollers. The front end of one piece of cloth is stitched to the rear end of a preceding piece, and as the cutter is finely adjusted in relation to the thickness of the cloth, and the passage thereunder of ends so doubled would cause damage to both cloth and cutter, it is usually necessary for the attendant to watch for the approach of the doubled ends toward the cutter, and then to lift the cutter stock until such ends have passed the cutter, after which the cutter stock is lowered. While it is obviously desirable to effect such lifting of the cutter stock automatically, and after the passage of the joined ends to return it automatically to its operative position, without stopping the machine, difficulties in the way of doing these things in a technically successful manner have been encountered in consequence of the variable lengths and more or less irregular shapes of the overlapping parts of the cloth and the tendency of the cutter stock when released to fall violently; and it is the object of this invention to overcome these difficulties and provide an improved and practical automatic device for the above purpose. I therefore arrange that the period during which the cutter stock is held up shall not be limited to the period of a single revolution of a power driven shaft, but that a dwell shall if necessary be allowed to the lifting mechanism, the duration of this dwell being variable according to requirements and therefore being controlled by detector mechanism in contact with the cloth; and also that the descent of the cutter stock cannot be hastened by reason of its gravity being suddenly added to the forces impelling the automatic mechanism which returns it.

In carrying out my invention I mount on a power driven shaft of the machine two ratchet wheels having their teeth cut in opposite directions, or a boss on which are formed two oppositely directed sets of ratchet teeth. Pawls controlling lifting mechanism are simultaneously thrown into or out of mesh with both sets of ratchet teeth by a spring-impelled slip ring, one of such pawls receiving the drive while the second pawl is carried around idly, but this second pawl when in gear prevents the rotary speed of the slip ring, and therefore of the pawls, from exceeding at any point of their revolution the speed of the said shaft. The slip ring has also two projections or catches, each adapted to engage a locking device actuated by the traveling cloth itself, and when either of these catches is so engaged the pawls are thrown clear of the ratchet teeth and the lifting mechanism remains stationary. When the first catch is engaged the cutter stock is in its normal position, and when the first catch is released so that the lifting mechanism becomes operative, the second catch is shortly afterward engaged, whereby the cutter stock is held up until, on the passage of the doubled ends of cloth being completed, the locking device is therefore caused to release the second catch, and to engage the first catch when the slip ring has completed a revolution, the cutter stock being thus gently lowered. Thus although a separately actuated lifting rod is as previously known employed to effect the lifting of the cutter stock, the control of the detector over such lifting rod is not merely momentary or limited to starting the lifting mechanism, but is retained until the doubled ends have passed the detector. I may also employ an auxiliary spring to counteract the weight of the cutter stock, and means for preventing back-lash or oscillation of the above described mechanism.

In cases where the cloth is thin, or if it is found that the action of the doubled ends on the detector is insufficient to bring about with certainty the proper action of the mechanism herein described, I may stitch or otherwise fasten on to the doubled ends an additional piece of cloth or other flexible material in one or more layers, in order to insure that the doubled ends do not pass the detector without the cutter stock being lifted.

The accompanying drawings illustrate mechanism for carrying out this invention.

Figure 1 represents in vertical section a portion of the machine including the cutter stock, detector and lifting connections.

Fig. 2 is a sectional plan of a gear box containing the catch mechanism for a multiple machine having four cutters.

Fig. 3 is a vertical section taken on the line III in Fig. 2 and on a larger scale and showing a simpler form of slip ring 34.

Fig. 4 is a detail hereinafter described.

Fig. 5 is a vertical section taken on the line V in Fig. 2, and on the same scale as in Fig. 2.

Fig. 6 is an isometric view of the double ratchet wheel or boss 28 detached.

Fig. 7 is a detail view of the cropping knives, drawn to a larger scale.

Referring firstly to Fig. 1, the reference numeral 1 indicates the framework of the machine, to which is pivoted at 2 the cutter bracket 3 carrying the stock 3$^a$ and helical cutter 4, the bracket 3 being provided with a lifting handle 5, and an adjusting spindle 6 resting on the bracket 7 and working through a nut in the bracket 3 to adjust the extent of action of the helical cutter 4 and fixed cutter 4$^a$ on the cloth. The action of the cutters is similar to that of a lawn mower. The cloth, indicated by dot-and-dash lines 8, travels over the tension rail or roller 9 and under the tension rail or roller 10, over the peaks 11 and 12, and over a roller 13, then to the next cutter or to a folding or cutting device at the end of the machine. The folding or cutting device is not shown, and the function of the cropping knives is that of removing projecting fibers from the surface of the cloth, so as to level the pile or nap of the cloth. The foregoing parts are all well known.

Below the roller 10 I place a detector roller 14 in contact with the cloth, this roller 14 being linked by a rod 15 to a bell crank lever 16 keyed on a short shaft 17. Loose on this shaft 17 is a cranked lever 18 linked by a rod 19 to an arm 20 projecting from the cutter stock. The lever 16 is linked by a rod 21 to a lever 22 (Fig. 3) and the lever 18 is linked by a rod 23 to a lever 24 (Fig. 3).

In the gear box 25 (Figs. 2, 3 and 5) is a shaft 26 which is continuously rotated. For convenience in adapting the invention to existing machines, this shaft 26 may be driven by any suitable gearing, (not shown) from the existing rotary shaft 27. The bosses of the levers 22 and 24 ride freely on the said shaft 27. On the shaft 26 is secured a double ratchet wheel or boss 28, shown on a larger scale in Fig. 6. Loose on this shaft 26 are two cams 29 (Figs. 2 and 3) and 30 (Figs. 2 and 5). The two cams are secured together by studs 31, on which studs are pivoted pawls 32 and 33 (Fig. 3), the former being a pointed or pushing pawl, while the latter is a hooked or pulling pawl. The pawl 32 is adapted to engage one set of teeth 28$^a$ on the wheel 28, and the pawl 33 is adapted to engage a reversed set of teeth 28$^b$ on the said wheel, but both pawls are normally inoperative as shown in Fig. 3.

A slip ring 34 is mounted in circular races or rings 35 which project laterally toward each other from the sides of the two cams 29 and 30, and which are concentric with the shaft 26. The slip ring 34 in connected with the cam 29 by a spring 34$^a$ which is normally in tension. The said cam 29 is provided with sockets 36 engaging the tail pieces of the pawls 32 and 33, and with a catch or projection 37 normally engaged by a latch 38 on the end of a plunger 39 linked to the lever 22. A second projection 40 on the slip ring has a finger 41 turned at right angles as shown in plan at Fig. 4, which finger is adapted to pass through the notch or gate 42 in the latch 38 when the plunger 39 has sent the said latch fully home, but when the latch is partially drawn back the finger 41 engages the end of the latch and is thereby brought to rest.

A bowl 43 on the lever 24 engages the cam 29.

A spring 44 (Fig. 5) keeps a bowl 45 in engagement with the cam 30, which has two stops or steps, 37$^a$ and 40$^a$, these steps being spaced apart to correspond with the spacing of the projections or catches 37 and 40. Thus in either position the pressure of the bowl 45 steadies the cam and opposes any tendency to back-lash or oscillation.

When a doubled portion of cloth passes over and slightly presses down the roller 14, the lever 16 is thereby rocked and causes the lever 22 to draw the latch 38 clear of the first catch or projection 37; the spring 34$^a$ then pulls around the slip ring 34 so that the sockets 36 put the pawls 32 and 33 in gear with the ratchet wheel 28, and the catch 37 comes against a stop or step 46 formed in the race or ring 35 of the main cam 29. The curved arrow in Fig. 3 shows the direction of revolution of the shaft 26 and cam. The ratchet wheel 28 being fast on the rotary shaft 26 carries around the pawls 32 and 33, and through the latter pawl 33 the drive is imparted by means of the studs 31 to both cams 29 and 30, while the pawl 32 is carried around idly in the teeth of the ratchet wheel. The cam 29 is thus caused to lift the bowl 43, rocking the levers 24 and 18 so as to draw down the arm 20 (Fig. 1) and lift the cutters 4 and 4$^a$ clear of the cloth. When the proud part of the cam is against the bowl 43, so that the cutters are fully lifted, the second catch 40 reaches the locking bolt 38. Now if the doubled ends have passed, allowing the parts 16, 22 and 38 to resume their normal positions, and the locking bolt is fully home, the finger of the second catch passes through the notch in the locking bolt, as indicated in Fig. 4, and the revolution of the cam is completed without interruption, the weight of the cutter bracket causing the levers 24 and 18 and bowl 43 to return to the positions shown in Fig. 3 as the larger side of the cam 29 passes from under the said bowl 43, until the latch 38 obstructing the further rotation of the slip ring causes the pawls 32 and 33 to be thrown clear of the teeth of the ratchet wheel 28, while at the same time the bowl 45 passes down the first step 37$^a$ of the cam 30.

If however the doubled ends have not passed the cutter when the second catch 40 reaches the latch 38, the finger 41 is stopped by the end of the wholly or partially withdrawn latch 38, so that the slip ring is checked and takes the pawls out of the teeth of the ratchet wheel. The cam then dwells or rests at the highest position until the doubled ends have passed and the locking bolt returns. The backward movement of the cams is prevented when the tooth 41 is in contact with the latch 38 by the step 40$^a$ on the cam 30 which then engages with the bowl 45. Then the second catch 40 being set free, the slip ring jumps and puts the pawls in the ratchet teeth again, and the cam completes its revolution.

In this return movement, the weight of the cutter stock tends to accelerate the movement of the cam, which might over-run the ratchet wheel, the hooked pawl 33 rattling past the teeth, so that the cutter stock would fall suddenly, but that the pawl 32 in mesh with the reversed ratchet teeth prevents the cam from going any faster than it is driven by the shaft through the ratchet wheel.

In addition to the arrangement just described, to prevent the cutter stock from falling sharply upon the adjusting brackets, I may employ a suitable brake in connection with the pivot of the cutter stock, or a spring such as is shown in dotted lines in Fig. 1, where an arm 47 on the cutter stock is connected by a spring 48 in tension to the framework 1 at 49. The lifting of the cutter stock causes the lower end of the arm 47 to approach the point 49, when the spring collapses, and on the descent of the cutter stock the resistance of the spring to extension brakes the said movement.

I claim as my invention:—

1. In a cloth cropping machine, cutting mechanism, shifting devices for moving the cutting mechanism out of engagement with the cloth, detector mechanism actuated by the thickened portions of the cloth, and catch mechanism interposed between the detector mechanism and the shifting devices and permitting the shifting devices to be operated to place the cutting mechanism out of action automatically when the detector mechanism is actuated.

2. In a cloth cropping machine, cutting mechanism, shifting devices for moving the cutting mechanism out of engagement with the cloth, detector mechanism actuated by the thickened portions of the cloth, retractible catch mechanism normally preventing the actuation of the shifting devices until retracted by the detector mechanism, and means for keeping the cutting mechanism out of engagement with the cloth until the catch mechanism has fully returned to its normal position.

3. In a cloth cropping machine, cutting mechanism, lever mechanism for moving the cutting mechansm out of engagement with the cloth, a cam for operating the lever mechanism, a rotary driving shaft, a slip ring mounted concentric with the said shaft and cam, detector mechanism operated by thickened portions of the cloth, catch mechanism operatively connected with the detector mechanism and normally preventing the slip ring from revolving, and means for automatically placing the slip ring in driving connection with the said shaft when the catch mechanism is operated by the detector mechanism to release the slip ring.

4. In a cloth cropping machine, cutting mechanism provided with a disengaging lever, a cam for actuating the said lever provided with a driving stop, a rotary driving shaft, a slip ring mounted concentric with the said shaft and cam and provided with a stop catch for engaging the said driving stop, a retractible locking catch which normally engages with the stop catch, a spring which advances the slip ring and places the stop catch in engagement with the said driving stop when the locking catch is retracted, and means for placing the slip ring automatically in driving connection with the said shaft when its stop catch engages the driving stop on the cam.

5. In a cloth cropping machine, cutting mechanism provided with a disengaging lever, a cam for actuating the said lever provided with a driving stop, a rotary ratchet-toothed driving wheel, a slip ring mounted concentric with the said driving wheel and cam and provided with a stop catch for engaging the said driving stop, a retractible locking catch which normally engages with the stop catch, a spring which advances the slip ring and places the stop catch against the said driving stop when the locking catch is retracted, and a pawl pivoted to the said cam and connected with the slip ring, said pawl being placed in driving engagement with the said driving wheel by the slip ring when the slip ring is advanced by the said spring.

6. In a cloth cropping machine, cutting mechanism provided with a disengaging lever, a cam for actuating the said lever provided with a driving stop, a rotary driving shaft, a slip ring mounted concentric with the said shaft and cam and provided with a stop catch for engaging the said driving stop, a retractible locking catch which normally engages with the stop catch, a spring which advances the slip ring and places the stop catch in engagement with the said driving stop when the locking catch is retracted, a spring-actuated check device which steadies the action of the said cam and prevents it from revolving backwardly when its stop catch is in engagement with the locking catch, and means for placing the slip ring automatically in driving connection with the said shaft when its stop catch engages the driving stop on the cam.

7. In a cloth cropping machine, cutting mechanism provided with a disengaging lever, a cam for operating the said lever provided with a driving stop, a rotary driving shaft, a slip ring mounted concentric with the said shaft and cam and provided with a main stop catch and an auxiliary stop catch arranged behind the main stop catch, a retractible locking catch which normally engages with the main stop catch and which normally permits the passage of the auxiliary stop catch, a spring which advances the slip ring and places the main catch in engagement with the said driving stop when the locking catch is retracted, and means for placing the slip ring automatically in driving connection with the said shaft when its main stop catch engages with the driving stop on the cam, the said auxiliary stop catch operating when arrested by the said locking catch to disconnect the said cam from its driving shaft and thereby delay the return of the disengaging lever to its normal position.

8. In a cloth cropping machine, cutting mechanism provided with a disengaging lever, a cam for operating the said lever, two ratchet-toothed driving wheels arranged side by side and revolving in the same direction and having their teeth arranged to project in opposite directions, a slip ring mounted concentric with the said driving wheels and cam and provided with a means for revolving the said cam, a straight pawl and a hooked pawl pivoted to the said cam and operatively connected with the said slip ring and normally held out of engagement with the said driving wheels, a locking catch which normally holds the slip ring from revolving, and a spring which advances the slip ring and places it in driving engagement with the cam when the locking catch is retracted and which simultaneously places the said pawls in engagement with the respective driving wheels.

9. In a cloth cropping machine, cutting mechanism provided with a disengaging lever, a cam for operating the said lever provided with a driving stop, a rotary driving shaft, a slip ring mounted concentric with the said shaft and cam and provided with a main stop catch and an auxiliary stop catch arranged behind the main stop catch, a retractible locking catch which normally engages with the main stop catch and which normally permits the passage of the auxiliary stop catch, a spring which advances the slip ring and places the main catch in engagement with the said driving stop when the locking catch is retracted, means for placing the slip ring automatically in driving connection with the said shaft when its main stop catch engages with the driving stop on the cam, the said auxiliary stop catch operating when arrested by the said locking catch to disconnect the said cam from its driving shaft and thereby delay the return of the disengaging lever to its normal position, a check cam revolving with the aforesaid cam and provided with stop surfaces spaced apart to correspond with the main and auxiliary stop catches of the slip ring, and a spring-actuated member which engages with the said check cam and steadies the action of the first said cam and prevents it from revolving backwardly.

In testimony whereof I affix my signature, in presence of two witnesses.

THOMAS CANBY.

Witnesses:
ERNEST PRIESTLEY NEWTON,
GEORGE HAROLD PEARSON.

Copies of this patent may be obtained for five cents each, by addressing the "Commissioner of Patents, Washington, D. C."